United States Patent
El Essaili et al.

(10) Patent No.: US 11,570,502 B2
(45) Date of Patent: Jan. 31, 2023

(54) PROVIDING PERSONALIZED MESSAGES IN ADAPTIVE STREAMING

(71) Applicant: Telefonaktiebolaget LM Ericsson (publ), Stockholm (SE)

(72) Inventors: Ali El Essaili, Aachen (DE); Alvin Jude Hari Haran, Sundbyberg (SE); Kristina Lazova, Aachen (DE); Zaheduzzaman Sarker, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/048,318

(22) PCT Filed: Sep. 17, 2018

(86) PCT No.: PCT/EP2018/075066
§ 371 (c)(1),
(2) Date: Oct. 16, 2020

(87) PCT Pub. No.: WO2019/210987
PCT Pub. Date: Nov. 7, 2019

(65) Prior Publication Data
US 2021/0152866 A1    May 20, 2021

Related U.S. Application Data

(60) Provisional application No. 62/665,057, filed on May 1, 2018.

(51) Int. Cl.
*H04N 21/266* (2011.01)
*H04N 21/2668* (2011.01)
(Continued)

(52) U.S. Cl.
CPC ..... *H04N 21/2668* (2013.01); *H04N 21/2402* (2013.01); *H04N 21/4882* (2013.01); *H04N 21/4884* (2013.01); *H04N 21/812* (2013.01)

(58) Field of Classification Search
CPC ............... H04N 21/24; H04N 21/2402; H04N 21/44209; H04N 21/44227;
(Continued)

(56) References Cited

U.S. PATENT DOCUMENTS 6,009,409 A * 12/1999 Adler ................. G06Q 30/0264
705/14.61
6,141,653 A * 10/2000 Conklin ................. G06Q 30/06
705/1.1
(Continued)

FOREIGN PATENT DOCUMENTS

WO    2011159464 A2    12/2011
WO    2019038736 A1    2/2019

OTHER PUBLICATIONS

International Search Report and Written Opinion of the International Searching Authority for PCT International Application No. PCT/EP2018/075066 dated Nov. 7, 2018.

*Primary Examiner* — Jefferey F Harold
*Assistant Examiner* — Timothy R Newlin
(74) *Attorney, Agent, or Firm* — Sage Patent Group

(57) ABSTRACT

The present disclosure relates to a method and an ad decision sever for determining personalized messages during a provisioning of digital content. The method comprises to provide a set of personalized messages candidates by executing a relevance algorithm, which matches message metadata and content metadata. The method continues with receiving calculated network costs for the set of personalized message candidates in order to determine a set of personalized messages, which are optimized with respect to the received network costs by applying a multivariate optimization algorithm.

13 Claims, 7 Drawing Sheets

(51) Int. Cl.
*H04N 21/24* (2011.01)
*H04N 21/488* (2011.01)
*H04N 21/81* (2011.01)

(58) Field of Classification Search
CPC ........... H04N 21/2668; H04N 21/4882; H04N 21/4884; H04N 21/812; H04N 21/2404
See application file for complete search history.

(56) References Cited

U.S. PATENT DOCUMENTS

| | | | | |
|---|---|---|---|---|
| 8,365,213 | B1* | 1/2013 | Orlowski | G06Q 30/0251 725/15 |
| 8,813,123 | B2* | 8/2014 | Khoo | H04N 7/17318 725/34 |
| 9,111,279 | B2 | 8/2015 | Benson | |
| 10,523,977 | B1* | 12/2019 | Neill | H04N 21/812 |
| 2002/0194065 | A1* | 12/2002 | Barel | H04N 21/812 705/14.69 |
| 2004/0261100 | A1* | 12/2004 | Huber | H04N 21/25891 348/E7.071 |
| 2007/0107011 | A1* | 5/2007 | Li | H04L 65/602 725/35 |
| 2007/0143370 | A1* | 6/2007 | Bushmitch | H04N 7/17327 |
| 2008/0034386 | A1* | 2/2008 | Cherry | H04N 7/165 725/35 |
| 2008/0204595 | A1* | 8/2008 | Rathod | H04N 21/44008 348/E7.001 |
| 2008/0291283 | A1* | 11/2008 | Achiwa | G06F 3/017 348/207.2 |
| 2009/0100459 | A1* | 4/2009 | Riedl | H04N 21/26225 725/35 |
| 2012/0289147 | A1* | 11/2012 | Raleigh | H04N 21/6547 455/3.06 |
| 2013/0144728 | A1* | 6/2013 | Ruarte | G06Q 30/0277 705/14.73 |
| 2013/0191221 | A1* | 7/2013 | Zhao | G06Q 30/0267 705/14.64 |
| 2013/0238761 | A1* | 9/2013 | Raleigh | H04L 67/2847 709/219 |
| 2014/0047071 | A1* | 2/2014 | Shehada | H04L 65/4084 709/219 |
| 2014/0115625 | A1* | 4/2014 | McCoy | H04N 21/25866 725/34 |
| 2015/0189350 | A1* | 7/2015 | Jo | H04N 21/4725 725/32 |
| 2016/0029055 | A1* | 1/2016 | Villegas Nunez | H04N 21/4667 725/14 |
| 2016/0112735 | A1* | 4/2016 | Stephens, Jr. | H04N 21/466 725/14 |
| 2021/0152866 | A1* | 5/2021 | El Essaili | H04N 21/4884 |

\* cited by examiner

PROVIDING PERSONALIZED MESSAGES IN ADAPTIVE STREAMING

CROSS REFERENCE TO RELATED APPLICATIONS

This application is a 35 U.S.C. § 371 national stage application of PCT International Application No. PCT/EP2018/075066 filed on Sep. 17, 2018, which claims the benefit of U.S. Provisional Patent Application Serial No. 62/665,057, filed on May 1, 2018, the disclosures and content of which are incorporated by reference herein in their entireties.

TECHNICAL FIELD

The present invention relates to enrich adaptive streaming content with personalized media content, like advertisement messages.

BACKGROUND ART

There is an increasing trend to personalize media content and tailor to individual user's preferences. Users are offered media (video, audio, etc.) which fit their habits, life style, etc. Media delivery systems are being optimized to serve specific functionality and requirements on the side of the client and to deliver unique experiences for the users.

Traditionally, content delivery networks (CDNs) are deployed for scalable delivery of content to the users. In case of adaptive video streaming (e.g., DASH), a packager (or segmenter) ingests media segments and manifest files (MPDs) into the CDN. The segments are distributed from an origin server to edge servers. The same content is replicated at different edges. A request redirection node is deployed inside a CDN, to redirect the client to a suitable edge server.

In personalized media delivery (e.g. personalized advertisements—in the following also abbreviated as 'ads' or 'adverts'), a dedicated server decides on the ad to be delivered to the client based on user profile, location, etc. The server selects an ad from a database which matches the user preferences. ads are typically grouped in categories (e.g., sports, science, health categories, etc.). The ad decision process is a complex operation and the server needs to select among a large number of possible options in a short time.

Personalization of media content includes the process of determining a content (ad or movie) for a user or a group of users based on statistics of viewing patterns, prediction of future consumption, association with other users who have common interests, etc. The objective of such a process is to determine a content (ad or movie) that best fits the user preferences.

As the user device computation power and storage capacity is increasing the traditional CDN architecture is further pushed towards user devices. The very personalized contents (media and ads) now can be the placed in the user device from the edge servers. This is often referred as device-CDN. In this case the request is resolved locally from the pre-populated device cache. This increased the response time and the server now have more control over the media quality it serves.

In DASH, the personalization of media content (e.g., personalized ads) is achieved by customizing the MPD (Media Presentation Description) [see DASH-IF, "Guidelines for Implementation: DASH-IF Interoperability Points", v3.22, May 2016]. To decide which ads to deliver to the client, a special node, namely the xlink resolver, consults an ad decision server. The ad decision server selects from a pool of ads a personalized ad to deliver to the clients. However, state of the art approaches do not utilize information about the actual (video) content in order to dynamically preload personalized ads into CDN and device caches.

The ad decision making is typically provided by a third party. The ad delivery process is independent of the video delivery which is provided by a CDN provider. The ad decision making process is independent of the consumed media content. ad decision servers are not aware of the title metadata or description of media that users are consuming. ad decision making is thus performed independently of the actual content user is interested in. This means that ad decision servers are missing an important piece of information when deciding on personalized ads for each user. A network provider (e.g., a CDN provider), is unaware of the ad decision process. The delivery of video and personalized ads is performed independently without exploiting common metadata information for the users. For the case of Device CDN, where ads could be preloaded, the communication between the ad decision process and CDN is vital to deliver personalized experience.

In prior art systems, personalized information retrieval (e.g. for ads/movies) aims at maximizing relevance, i.e., how relevant a search result is with respect to a query. This is decoupled from other network functions, key performance indicators (KPIs) that are known to an edge server.

Thus, solutions according to state of the art lack specificity in personalization. In particular, there is a deficiency in that the actual content to be delivered to the client's device is not sufficiently matched with the content of the ad message for assessing relevance. Therefore, more data segments need to be provided to the client, resulting in more network traffic.

Thus, there is a need in state of the art to specify content to be delivered to the client in order to be able to select relevant content and to save network distribution and storage costs.

SUMMARY OF THE INVENTION

Therefore, an object of the present invention is to improve known personalization systems in adaptive streaming and to overcome the drawbacks of state of the art systems, mentioned above. In particular, it should be possible to utilize the actual content to be delivered to the client for calculation of the personalization of the messages (in particular advertisement messages) during streaming content data by automated processes. The amount of network traffic and the amount of resource consumption should be reduced.

This object is achieved by the independent claims. Advantageous features and embodiments are mentioned in the dependent claims and in the description.

According to a first aspect, the invention relates to a method for determining personalized messages (which may for example comprise advertisement messages) during a provisioning of digital content. The method comprises to provide a set of personalized message candidates by executing a relevance algorithm, which matches message metadata and content metadata. The method continues with receiving calculated network costs—which may be received from another entity or which may be provided locally—for the set of personalized message candidates in order to determine a set of personalized messages, which are optimized with respect to the received calculated network costs.

The invention is based on the idea to provide a computer-implemented matching mechanism for matching messages with video content to be provided on a client device in a manner which considers actual content of the video. Due to the matching mechanism it is possible to select those messages for client provisioning which are dynamically adapted at best to the actual video content.

According to a preferred embodiment the relevance algorithm comprises to calculate a relevance score for all personalized message candidates in order to prioritize the candidates as a function of relevance. This feature has the advantage that the complex relevance calculations may be represented in a (simple) score, like an integer, a data set or a string and thus in a very efficient manner, which contributes to reduce processing and storage capacities. A simple score or integer is much more easier to process as more complex data structures.

According to another preferred embodiment the relevance score is dynamic and may change in reply to a temporal progress of the content provisioning, such as the relevance score is iteratively calculated during content provisioning. Preferably, the content metadata may be provided in a dynamic manner, too. In a preferred embodiment, there is provided an option in the manifest file (e.g. MPD) which indicates that the metadata is dynamic. Typically, the MPD will not be completely known in advance and will be updated over time. In on-demand, the MPD is typically static.

In another preferred embodiment the streaming process is an adaptive streaming process and in particular refers to streaming of content in a DASH, a HLS or another http-based streaming format. Depending of the format used, the length of the generated media segments of the content is set. The segmentation of the content is necessary, as this enables the switching between the different video/audio qualities during the adaptive streaming session.

In a further preferred embodiment, the method further comprises a processing of demographic and operational constraints for provisioning of digital content to the client device, which acts as viewer. Operational constraints comprise the technical network layer and the costs for content provisioning (transmission, storage and/or network costs). Demographic constraints may comprise demographic data, like the actual position/location of the client device, age of the user etc. This has the advantage that e.g. location-based messages may be selected and/or prioritized for being provided to the client.

According to another preferred embodiment, optimization of the determined set of personalized messages comprises the step of applying a multivariate optimization algorithm in order to calculate an optimum of the determined set of personalized messages. The multivariate optimization algorithm is maximizing the calculated relevance score and is in parallel minimizing the demographic and operational constraints and in particular the network costs. After this optimization step with a selection of optimal messages, it is possible to only provide the client device with those messages which are best optimized for the client, by taking into account predefined constraints (e.g. constraints may relate to the network, to the content, to costs, to demographic data of the user and others and conditions). Thus, network resource consumption is decreased and improved.

According to another preferred embodiment, the relevance algorithm serves to calculate the relevance of a particular (ad) message from a set or pool of messages for a specific title of the content. The relevance algorithm may be based on a Jaccard Similarity, a BM25, a BM25F, a cosine similarity algorithm, a latent semantic analysis, a latent Dirichlet allocation, a Pachinko allocation and/or a TF-IDF algorithm.

According to another preferred embodiment, the metadata are extracted automatically, in particular by using a computer vision algorithm, an audio and/or sound recognition algorithm and/or by processing subtitle data. The computer vision algorithm may comprise computer implemented automatic image recognition with pixel and pattern analysis. The computer vision algorithm may comprise machine vision processes that involve different kinds of computer processing from object and character recognition to text, speech, content and sentiment analysis. This is valid for both types of metadata, content metadata and ad metadata, wherein content metadata refers to metadata extracted by analyzing the content itself.

In a further preferred embodiment, the content metadata are extracted automatically, in particular by determining the requested content from a URL or from a manifest file. In a first embodiment, the content metadata are extracted from the manifest file (e.g. MPD) directly or indirectly from a unique identifier (UID) contained in the manifest file.

According to another preferred embodiment, the set of cost-optimized personalized messages is determined for a group of client devices. This helps to improve flexibility and efficiency of the method so that users may be grouped according to configurable criteria (location, demographic data etc., available bandwidth etc.).

According to another preferred embodiment, the determined set of cost-optimized personalized messages is prepared for pre-loading into a client device for offline viewing or into a content server, wherein the content server may be a CDN Origin or a CDN Edge.

According to another aspect the invention refers to an ad decision server. The ad decision server is responsible for deciding which message to be added to the content which is to be provided on a client device during streaming of content. The ad decision server comprises different interfaces. A first metadata interface is provided which is adapted to receive message metadata. A second metadata interface is provided which is adapted to receive content metadata. A third interface, namely a cost interface is provided which is adapted to receive calculated network costs for the set of personalized message candidates. The network cost calculation is preferably executed at the content server and provided to the ad decision server. The ad decision server further comprises a processing unit for providing a set of personalized message candidates by executing a relevance algorithm, which matches message metadata and content metadata. In case the ad decision server is not co-located with the content server, then, since cost calculation should be done at the content server, the latter beforehand needs to be provided with the set of candidates. The ad decision server further comprises an output interface for providing a determined set of cost-optimized personalized messages. Thus, in a preferred embodiment, the ad decision server is adapted to execute the multivariate optimization algorithm as mentioned above. Further, it should be noted, that the aspects and features mentioned above with respect to the method may also be applied here in the solution according to the apparatus/server.

According to another aspect the invention refers to a content server for providing content. The content server is equipped with an ad decision server as described above and with a measurement unit for calculating network distribution costs for the set of personalized message candidates.

According to another aspect the invention refers to a network system with a client device, a content server, a first metadata interface, which is adapted to receive message metadata and a second metadata interface which is adapted to receive content metadata and a processing unit for providing a set of personalized message candidates by executing a relevance algorithm, which matches message metadata and content metadata. The network system moreover comprises a cost interface which is adapted to receive calculated network costs for the set of personalized message candidates and an output interface for providing a determined set of cost-optimized personalized messages.

The invention in particular the method mentioned before may be provided as a computer program loadable into a processing unit of a network unit, a device and/or a server. The computer program comprises code adapted to perform the steps of the method as mentioned before when processed by the processing unit.

The computer program may be stored on a computer readable medium or data carrier, like a memory stick. The computer program may also be downloaded in downloadable form from a server entity. The computer program may be virtualized and/or may be distributed over different network nodes.

BRIEF DESCRIPTION OF THE DRAWINGS

In the following, the invention will further be described with reference to exemplary embodiments illustrated in the figures, in which.

DETAILED DESCRIPTION

Figure 1:
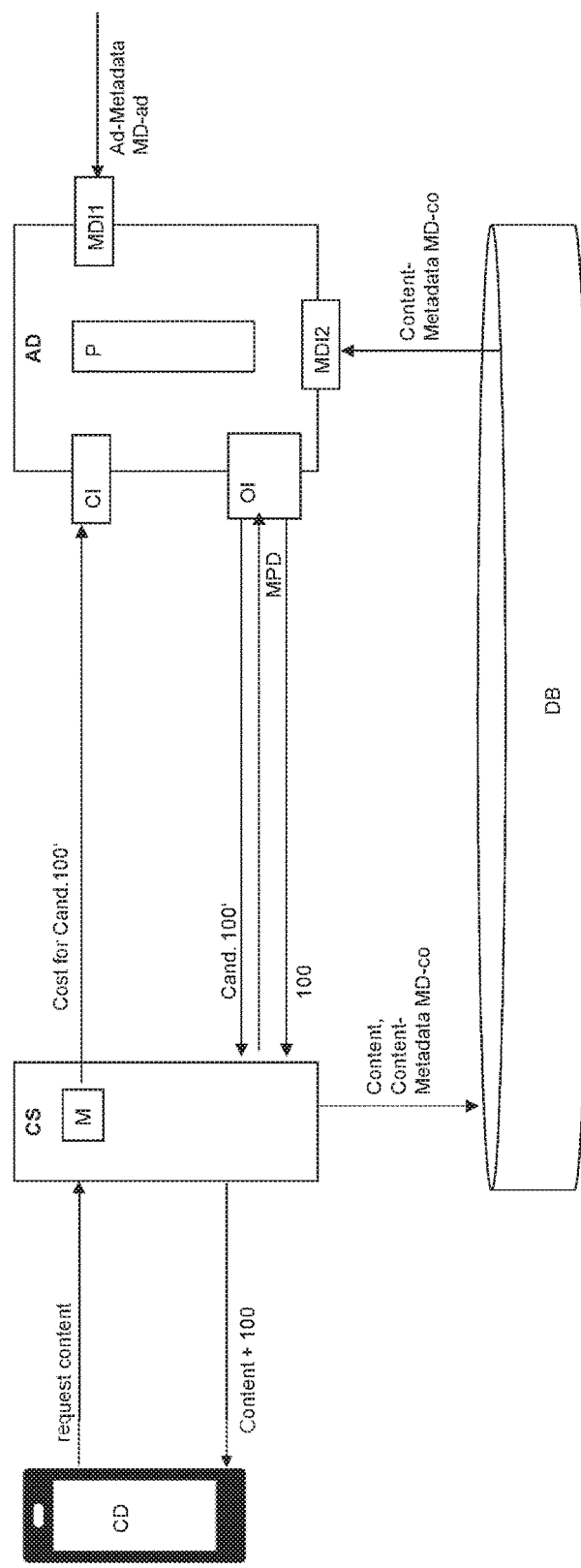
FIG. 1 shows a schematic representation of a system for determining personalized messages during a provisioning of digital content in an exemplary embodiment of the present invention.

The present invention relates to determination of personalized messages during a provisioning of digital content. The messages may comprise and preferably relate to advertisements or other content, different from the content of the streaming data, e.g. video and/or audio data. The method according to the invention (with the relevance algorithm) couples and algorithmically combines the calculation of a relevance score with network functions and in particular with network costs.

In general, the invention refers to using metadata from both (e.g. advert) messages and content (title) to calculate content-based similarity as a means of finding relevance, and to then use this measure along with delivery cost metrics as input to a multivariate optimization algorithm which finds the most relevant (e.g. advert) message for a particular user while maintaining lower costs and abiding by SLA. Thus, the invention provides measures to determine a set of personalized messages that are both relevant and cost-efficient. Both optimization criteria are applied in common or in parallel. Thus, the result may reveal messages that are not most relevant. Also, the result may reveal messages that are not most cost-efficient as both aspects are considered and synchronized.

A multivariate optimization is proposed to maximize relevance when selecting a personalized ad while minimizing the costs for a service provider. The result of the multivariate optimization is a set of personalized messages that is both relevant and cost. Efficient. The approach considers multiple variables in common as content-meta data of currently consumed (and streamed) video content, operational and demographic costs for a service provider as memory, network, and fetching costs to determine an ad which maximizes the relevance. A global optimization is applied at an edge to globally maximize the relevance while minimizing costs for a service provider.

The proposed solution provides a method for dynamically pre-loading personalized (advertisement) messages into CDN caches and device CDNs based on the actual consumed media content. The method utilizes metadata information (e.g., categories, genre, cast) about the video content to trigger the ad decision system to find at least one personalized (advertisement) message and allows further optimizations as pre-loading the respective message to the CDN cache and device cache before actual playout time.

A core idea of this application is to provide methods for a network provider e.g., to enhance the delivery of personalized messages using metadata of the main content in order to maximize relevance while satisfying certain KPIs for a service provider. The metadata can be acquired in real-time by extracting properties of the main video content or known a priori based on prior knowledge about users' interest in watching a certain event or content or some combination of both.

In the following a short definition of terms is given.

The term "message" relates to an electronic message in a digital format to be provided on a user device. It may be a message which has a content which is different from the one of the (main) digital content. The message may, in particular, comprise an advertisement-message. Thus, the term 'message' may therefore be designated more specifically as 'ad-message' (and may in the following also be named as ad or advert). The origin of the ad-message is typically different from the origin of the video content. In other embodiments, the message may also comprise or relate to other information and data than advertisements, like personalized information, e.g. a personalized, location-based weather forecast. The message is personalized so as the message is related to the requirements of the receiving client device and thus to the preferences of the user.

Digital content is to be understood as broadcasting (comprising life broadcasting) or streaming content (e.g. in real-time (live), or recorded media (on-demand), in particular adaptive streaming. Streaming data may comprise video data and/or audio data or any other type of media in general. Digital content is prepared to be provided to the client device and to be watched by the client.

A content delivery network (CDN) comprises a plurality of network nodes which are usually deployed in multiple locations, often over multiple backbones. Benefits include reducing bandwidth costs, improving page load times, or increasing global availability of content. The number of nodes and servers making up a CDN varies, depending on the architecture, some reaching thousands of nodes with tens of thousands of servers on many remote points of presence (PoPs). Others build a global network and have a small number of geographical PoPs. Requests for content are typically algorithmically directed to nodes that are optimal in some way. When optimizing for performance, locations that are best for serving content to the user may be chosen. This may be measured by choosing locations that are the fewest hops, the least number of network seconds away from the requesting client, or the highest availability in terms of server performance (both current and historical), so as to optimize delivery across local networks. When optimizing for cost, locations that are least expensive may be chosen instead. In an optimal scenario, these two goals tend to align, as edge servers that are close to the client device of the end-user at the edge of the network may have an advantage in performance or cost. Most CDN providers will provide their services over a varying, defined, set of PoPs, depending on the coverage desired, such as United States, International or Global, Asia-Pacific, etc. These sets of PoPs can be called "edges", "edge nodes" or "edge networks" as they would be the closest edge of CDN assets to the end user.

Provisioning of digital content in a CDN network relates to online provisioning and in particular relates to adaptive streaming of content like videos and/or audio files. The adaptive streaming may in particular be an MPEG-DASH (Dynamic Adaptive Streaming over HTTP, according to ISO/IEC 23009-1, which is a vendor independent, international standard ratified by MPEG and ISO. As an alternative adaptive streaming technique HLS may be used. The basic idea of such an adaptive streaming technique is to chop the media file into segments which can be encoded at different bitrates or spatial resolutions. The segments are provided on a web server and can be downloaded through HTTP standard compliant GET requests. The HTTP Server may for example serve three different qualities, i.e., Low, Medium and Best. The media file is chopped into segments of equal length. The adaptation to the bitrate or resolution is done on the client side for each segment, e.g., the client can switch to a higher bitrate—if bandwidth permits—on a per segment basis. This has several advantages because the client knows its capabilities, received throughput and the context of the user best. In order to describe the temporal and structural relationships between segments, MPEG-DASH introduced the so-called Media Presentation Description (MPD). The MPD is an XML file that represents the different qualities of the media content and the individual segments of each quality with HTTP Uniform Resource Locators (URLs). This structure provides the binding of the segments to the bitrate (resolution, etc.) among others (e.g., start time, duration of segments). As a consequence, each client will first request the MPD that contains the temporal and structural information for the media content and based on that information it will request the individual segments that fit best for its requirements.

The network costs are the technical costs for network distribution of the content with the determined messages. The network costs may comprise distribution or delivery costs. The delivery costs comprise storage costs, bandwidth costs, peering costs that could involves multiple entities (e.g., ISPs), server transmission costs. In the embodiment, in which device CDNs are provided, it is possible to preload determined messages, so that the communication between the ad decision process and CDN may be improved and is vital to deliver personalized experience. The distribution costs are calculated at the content server. The processing of network costs, has the advantage to be able to provide a network optimization procedure by a network provider (e.g. CDN) and to improve the delivery of customized messages via the network. The delivery costs are tightly linked to the traffic volume and distribution technology. It is crucial for a CDN provider to minimize its costs when deciding on how and when to cache and distribute content (enriched with personalized messages) to the users.

A service level agreement (SLA) is a contract between a provider and a consumer. For a CDN provider, SLAs are usually established with an ad provider to ensure certain performance KPIs are in place. Therefore, when determining the best ad to deliver to the user, the CDN provider should ensure that these KPIs are satisfied, for instance that messages are loaded within a time range when requested by the user (response time).

Metadata is an electronic dataset and may comprise different types of parameter and data relating to and providing additional data or information to the main content (e.g. video, actual streamed content to be provided to the client device). The method according to the invention processes two types of metadata: first metadata of the content and second metadata for the message. Both types of metadata can also be produced automatically based on automated metadata generation techniques which use some combination of vision and/or audio recognition. Various techniques can be used for automatic metadata generation, including computer vision algorithms, subtitle processing (for content), audio processing, sound recognition, etc. commonly done in the domain of MultiMedia Information Retrieval (MMIR). Automatic Metadata Generation could produce human-readable metadata, or machine-readable only. For both types of metadata machine learning algorithms may be used, analysing content to find concepts, themes, cast and so on. This has been done by analysing images frame by frame, audio tracks, subtitles, and many more. Metadata for content may for example be extracted from the title. The video contents can be used to identify type. E.g. if it's a motion picture, a cartoon, or a computer-generated movie. The subtitles can be used to identify plot keywords such as where the movie is set. The audio track can be used to identify explosions, to indicate it is more of an action movie. The use of automated techniques for metadata generation could lead to an explosion in the amount of metadata generated for each content.

The relevance algorithm is an automatic computer implemented process to be executed on a computer, which matches, compares or analyses different types of metadata, namely metadata of the actual content to be provided on the client device and the metadata of the message. The relevance algorithm processes metadata information about the actual (e.g. video) content to dynamically pre-load personalized (ad) messages into the CDN and device caches. The relevance algorithm combines and interlaces features of the delivery process of content to those of the delivery process of messages, wherein the processes as such are independent processes. The relevance algorithm processes ad-message recommendations dependently from the requested content. For example, if a user is watching an action movie, then an advert message featuring an action star would make more sense than that of a comedian. Another example relates to a user is watching the movie Fight Club starring Brad Pitt, and it has been decided that a Chanel No. 5 advert message is to be provided based on some SLA. Chanel like many large brands have multiple adverts, say there are currently two options: one starring Brad Pitt and another starring Audrey Totou. In this case showing the user the version with Brad Pitt would make more sense since Brad Pitt is a cast member in the movie currently watched. The impact of the advert is therefore increased as it is more relevant to the title. Another example relates to providing media about events. If a person is watching a match between Manchester United and Liverpool, and an Adidas advert is to be shown. Assume Adidas has a number of adverts featuring many different players including one featuring the Manchester United player Alexis Sanchez and another featuring the Tottenham player Harry Kane, then the advert featuring the former makes more sense since he is in the game. Additionally, this can be adapted in real time for live events. So, according to the invention, it is assured that (advert) messages are not shown, featuring a player who is no longer in the game, or a player with currently negative sentiments, e.g. if he was just handed a red card, or just missed a penalty. The advert has a better impact by using more relevant advert message under the circumstances and context. Circumstances and context are represented in the metadata of the content, which is considered for determination of the personalized and optimized ad messages. Moreover, the method and solution according to the invention may use past preference to personalize relevance to the individual user. For example, if a user is known to prefer action movies over dramas, then a funny advert message could be more applicable than one with explosions. If a user prefers Brad Pitt as an actor over Audrey Totou, then the former can be prioritized. Relevance can also be associated to past consumption. An advert message which has been watched multiple times becomes less relevant (typically referred to as ad fatigue), and could be another factor in personalization.

The term "relevance score" is a measure for relevance between the message and the content to be provided to the client device. The relevance score is calculated by executing a relevance algorithm. The relevance algorithm may comprise a measure for similarity. In a preferred embodiment, the relevance algorithm is designed to be more complex than simple calculation of similarity and may in addition comprise to consider the context and/or personal preferences of the user during calculation of the relevance score. The context to be considered includes that of the message, content, time, companion and location. Details on what context parameters to consider is an active research area, and some factors such as the above are known e.g. "Recommendation with Differential Context Weighting" by Yong Zheng, Robin Burke, and Bamshad Mobasher (2013). Recommendations and similarity are different concepts but are both applied in the relevance algorithm. The relevance algorithm preferably uses a content-based collaborative approach, in particular a content-based collaborative filtering technique. The collaborative filtering algorithm is based on the assumption that if it has been determined for a user group liking A, the group tends to also like B, that A and B have to be evaluated as being similar. For providing a sufficient basis of disclosure it is referred to WO2000017792A1 "Collaborative recommendations using item-to-item similarity mappings" as well as academic paper "Item-based collaborative filtering recommendation algorithms" by B Sarwar et. Al. The content-based algorithm is further based on the idea that items that share the same description or features must be similar. It is to be noticed that similarity describes the relationship between items to items, whereas recommendations on the other hand are based on the relationship between users to items. Generally speaking, content similarity does not change over time, whereas recommendations could change as the user consumes different items. Further, the relevance algorithm makes use of a cross-domain content-based recommendation system. 'Cross-domain' because one domain is content (movies) and another is (advertisement) messages. 'Content-based' because the relation or connection between these two domains is evaluated by means of processing a 'description' in the form of metadata of both, of the content (movies) and of the messages. This invention, thus, uses a cross-domain and content-based approach.

The relevance score is used to measure how relevant the search results (with the ad messages) are to the query. In this case the "query" is implicit: "what advert should be recommended to the user, based on she or he is currently watching". Further, the invention relates to personalized information retrieval, so if Alice and Bob are both watching the same thing, they can receive different adverts because of their previous behavior or their demographic information. The relevance score can be calculated at the content server or ad decision server. It is also possible that the ad decision server is co-located with the content server i.e., on a CDN edge with ad decision capabilities.

The ad decision server is responsible for determining a message, in particular an ad-message, but cannot host content or generate a manifest file (e.g. like MPD). It uses metadata information and network cost information provided by the database and CS to determine the ad message. The ad decision server AD may be located inside the CDN. However, the ad decision server AD may also be provided as a separate instance to the CDN or content server CS or in a distributed manner in order to improve decision efficiency.

In general, the invention is based on that fact to use content similarity metrics to deliver the most relevant message to the client device of a user, while keeping the cost down using delivery measures, and fulfilling SLA obligations. To do this, first a content-based similarity is calculated between multiple candidate messages and content items (e.g. title watched) using metadata for each, and optionally factoring demographic information of the viewer. Second, costs for delivering each of these candidate messages are calculated with measures, comprising such as distribution volume, throughput, latency, and hops. Finally, a multivariate optimization technique is used to find the best message (e.g. advert) to be provided to the client device. An edge can apply optimizations as pre-loading of the best message into its cache.

In the following the invention is explained in more detail with respect to the figures.

FIG. 1 shows a system architecture according to a preferred embodiment. A client device CD request a video content from a content server CS, which might be a node in a content delivery network CDN or a CDN edge. The content server CS interacts with an ad decision server AD, which is adapted to provide the decision, which of a plurality of possible ad messages to be provided to the client device CD with provisioning of his content. The system comprises a database DB, which stores actual content and metadata MD-co about the content.

The method for determining personalized messages 100 during a provisioning of digital content comprises two major automatic, computer-implemented processing steps:
1. Providing S1 a set of personalized message candidates 100' by executing a relevance algorithm, which matches message metadata MD-ad and content metadata MD-co;
2. Receiving S2 calculated network distribution and storage costs co for the set of personalized message candidates 100' in order to determine S3 a set of personalized messages 100, which are optimized with respect to the received network distribution and storage costs co.

The ad decision server AD receives two different sets of metadata, a first set of metadata for the content MD-co and a second set of metadata for the (ad) message MD-ad. Typically both metadata sets MD-ad, MD-co are received via different interfaces from different databases and origins. A processor P, provided at the ad decision server AD is adapted for providing the set of personalized message candidates 100' by executing a relevance algorithm, which matches message metadata MD-ad and content metadata MD-co.

As can be seen in FIG. 1, the content server CS (origin server or MPD generator at the origin server) is responsible for generating the manifest (e.g. MPD). The content server CS comprises a measurement unit M, which is adapted for calculating network distribution costs co for the set of personalized message candidates 100'. The candidates 100' are provided and calculated on the ad decision server AD and are provided to the content server CS. The content server CS then calculates the costs involved in transmission of the respective candidates 100' to the client device CS in reply to reply to the received candidates 100'. In turn the calculated costs co are again re-transmitted back from the content server CS to the ad decision server AD for further processing, namely for determining the set of personalized and cost-optimized messages 100, which are cost-optimized with respect to network costs. The so determined messages 100 are transmitted as decision result via the output interface OI to the client device CD.

The ad decision server AD comprises different interfaces, comprising:
  A first metadata interface MDI1 which is adapted to receive message metadata MD-ad and
  A second metadata interface MDI2 which is adapted to receive content metadata MD-co;
  A cost interface CI which is adapted to receive calculated network (distribution/delivery) costs co for the set of personalized message candidates;
  An output interface OI for providing a decision result, in particular in the form of a determined set of cost-optimized personalized messages 100.

In the example embodiment, shown in FIG. 1, the ad decision functionality is comprised within a dedicated ad decision server AD, which may be provided separately from the content server CS.

Figure 2:
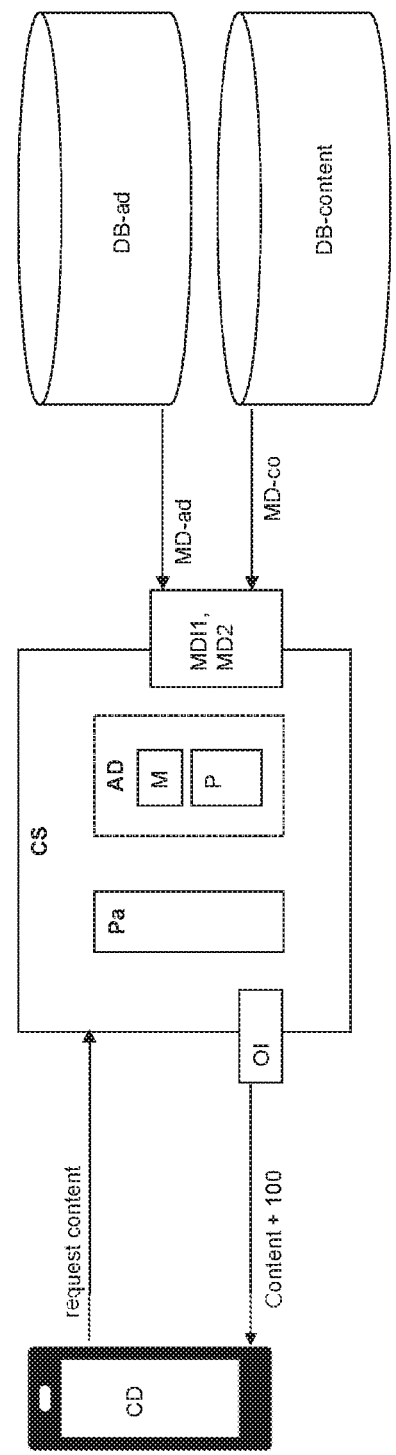
FIG. 2 is an alternative system architecture in which an ad-decision server is co-located with a content server according to another preferred embodiment of the invention.

In another embodiment, the ad decision server AD may be co-located on the content server CS (depicted with the dotted line in FIG. 2) or the latter may be provided with the functionality of the ad decision server AD (then the units or (software) segments of the ad decision server AD may be directly implemented on the content server CS. This embodiment is further explained with reference to FIG. 2.

The content server CS thus comprises the measurement unit M as in FIG. 1 but in addition comprises the processing unit P. For receiving the metadata MD-ad, MD-co the content server CS comprises the interfaces MDI1 and MDI2 for receiving the metadata from different origins, namely an ad message database DB-ad and a content database DB-content. In the example shown in FIG. 2, a packager Pa will be involved for providing the formatted content enriched with the result message 100 for adaptive HTTP streaming to the CS or CD (the actual content not manifest). The packager Pa may be co-located with the content server CS or may be provided as separate instance.

Figure 3:
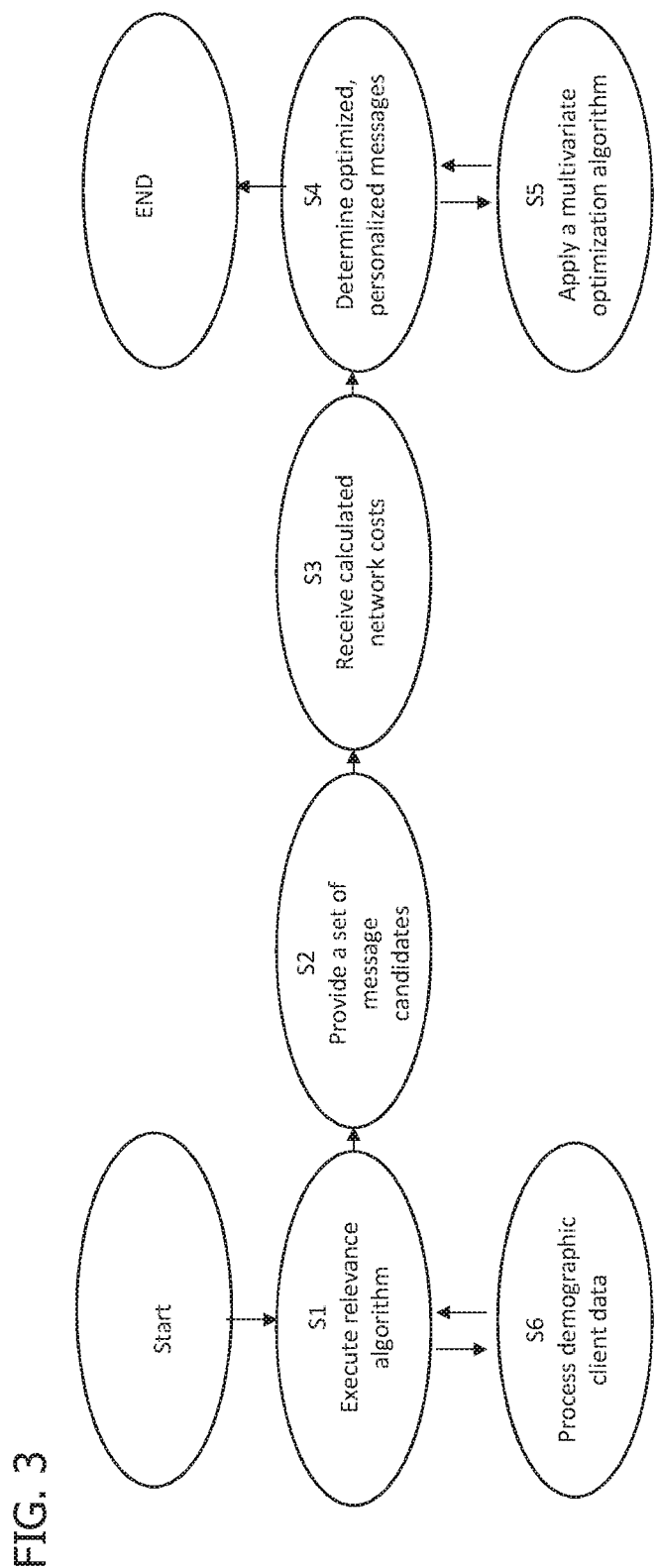
FIG. 3 is a flow chart of a method according to a preferred embodiment of the present invention with different options and embodiments.

A typical flow chart is depicted in FIG. 3. After START, in step S1 a relevance algorithm is executed. Optionally, demographic client data may be processed in step S6. The relevance algorithm processes as input data two different sets of metadata: first ad message metadata MD-ad and second content metadata MD-co for providing an intermediate result with a set of (preliminary) personalized ad message candidates 100' in step S2. In step S3 calculated network costs co for each of the candidates 100' are received from the content server CS, which before hand was informed about the intermediate result with the candidates 100'. After having received the costs co for the candidates 100' a multivariate optimization algorithm is applied in step S5 for determining a final result with an optimized set of personalized messages 100 in step S4. After this the method may end or may be rerun.

In the following it is explained how metadata about the content MD-co may be extracted.

The edge can determine the requested video content from the URL. The URL typically indicates some video content or channel identifier. The title metadata information can be extracted in different mechanisms at the edge:

1) The URL of the manifest request identifies the video content to be streamed. The URL is typically provisioned at the player or available to the player application through service discovery. The URL would look like: http://hostname:port/videoID/format/.../manifest.mpd In this case, the edge parses the URL to know the video identifier and match with the database.

2) The URL is not identifying the video content but the body of the request includes further information to identify the video content. In an example, the edge may parse the body of the request, and extract the video identifier and match it with the database (field called referrer).

3) In a third case, the edge doesn't parse the request URL or request header but reads the MPD and extracts the video content identifier from the segment URLs. Example MPD with baseURL indicating movie identifier. The approach, however, requires parsing of URLs and adds complexity to the edge.

4) The fourth approach is to read metadata information in the MPD at the edge. This is the most straightforward way because it directly includes title metadata. This can again be achieved at different levels:

a) If the metadata is defined for the whole program then MPD allows to define <ProgramInformation> element at the MPD level which include <Title> information.

b) If the metadata changes for each adaptation set, then the <adaptationset> includes a <Role> field for defining metadata.

c) If the metadata changes at the segment level, then the metadata can be added to the initialization segment.

In the following it will be described how to retrieve full title metadata from a database.

The goal of this step is to retrieve descriptions or metadata about the title of the content from a database which contains this information, henceforth referred to as the Metadata Database. There are a few methods in which this lookup could be performed, depending on the setup and the relationship between the entities providing the title, metadata library, and CDN, three are listed below.

Method 1: If the MPD contains a unique identifier (UID) such as a primary key, UUID or IMDB ID, and the Metadata Database understands the UID, then we can perform an immediate lookup based on this information alone.

Method 2: If the UID is not understood by the metadata provider, then we use the title as input to a search function which searches the Metadata Database, specifically in the 'name' or 'title' column for an entry which corresponds to that of the MPD. Any relevant information besides the Name which can be extracted from the MPD can be used here. Search functions using various methods from Information Retrieval can be used, including TF-IDF.

Method 3: Movies could have different titles in different markets, sometimes due to language difference, or simply due to market preference. The Metadata Database could therefore hold the name of the titles in different languages or another column for 'alternate names'. Knowledge of the language could be important in future steps and may therefore be important to be indicated as part of this process. For example, the similarity models may work better with English than French, and therefore we may want to retrieve the English version although both exist.

The title Metadata could be supplied by the owner or distributer, could be manually entered by a separate entity specializing in this domain such as IMDb, or FYI Television, it could be manually entered by the content distributor, or by some combination of any.

The title metadata retrieved could be a combination of human-supplied (as mentioned above), machine generated (see above) and presented in a format that is human-readable or not human-readable.

In the following it will be explained how to retrieve a list of ad messages.

The goal of this step is to retrieve all possible adverts or candidate messages 100' in general that can be shown here, along with the corresponding metadata, keywords, concepts, or description on the message in order to be used to find relevance to the content. This pool of (ad) messages depends on the SLA or other agreements between content providers, advertisers, and CDN providers. In this example, it is assumed that there is not one specific advert that has to be shown to all viewers, but any of those from a pool.

The ad decision system requests for the list of adverts from a system that knows all possible answers, henceforth referred to as the ad List Database. This system could be hosted by the content provider or the CDN provider, within bounds of agreements between the two entities.

The pool of adverts is then augmented with relevant metadata, keywords or description. The keywords be retrieved in one fell sweep from the ad List Database or a separate database referred to as ad Keyword Database. In the latter case, the list of ads is sent to the ad Metadata Database, which returns the list of metadata for each advert. The Metadata could be in the same format as in the step before, which means it could include a contextual list indicating item name, director, cast etc., or just a list of keywords among others.

The ad Metadata could be supplied by the owner or distributer, could be manually entered by a separate entity specializing in this domain, could be manually entered by the content distributor, or by some combination of any.

Metadata MD-ad can also be produced automatically based on automated metadata generation techniques which use some combination of vision and/or audio recognition. As mentioned before, in the context of content metadata MD-co generation, again for the ad metadata MD-ad generation various techniques can be used for automatic metadata generation, including computer vision techniques , subtitle processing, audio processing, sound recognition, etc. commonly done in the domain of MultiMedia Information Retrieval (MMIR). Automatic Metadata Generation could produce human-readable metadata, or machine-readable only.

The final list of advert and corresponding metadata retrieved could be a combination of human-supplied, machine generated and presented in a format that is human-readable or not human-readable.

In the following passages it will be explained how relevance is calculated between content and ad message.

The overall goal is to calculate the relevance between a title (content) to a pool of adverts (messages). This is done based on metadata MD-ad, MD-co. Thus, input of the relevance algorithm is the metadata and/or keywords (or concepts) for both the title and the advert. In the example shown in the table below, this relevance score represents the value in column 3 (relevance).

| User  | Advert | Relevance (%) | Cost (units) |
|-------|--------|---------------|--------------|
| Alice | 1      | 99            | 100          |
| Alice | 2      | 98            | 10           |
| Alice | 3      | 50            | 1            |
| Bob   | 1      | 90            | 10           |
| Bob   | 2      | 90            | 5            |
| Bob   | 3      | 99            | 10           |

The metadata for the title is such as genre, cast, director, producer, plot keywords, etc from the step before. The metadata for the advert MD-ad can contain similar information including item name, item type, advert genre, and so on as in step before.

In an ideal scenario, the most salient keywords of both titles and adverts are known a priori. E.g. for the movie Pulp Fiction: <Crime, Quentin Tarantino, Bruce Willis, Dark Humor, Non-linear>. This can be done manually by a single person or labelled by a group of persons. If a group of individuals supply this information, then consensus measures can be used to identify which keywords are most important to the most number of people. Methods such as word2vec can be used to predict keywords or concepts not explicitly supplied by humans nor within the title metadata. It is possible that predicted or generated keywords/concepts may only be understood by the computer and not human readable. In the case where metadata is supplied but the keyword importance is not ranked, algorithms such as Jaccard Similarity, TF-IDF, BM25, BM25F, Cosine Similarity, Latent Semantic Analysis, Latent Dirichlet Allocation and Pachinko Allocation can be used among others.

A rudimentary similarity score S can be done with Jaccard Similarity; given Title Keywords (Tk) and Advert Keywords (Ak):

$$S = \frac{|T_k \cap A_k|}{|T_k \cup A_k|}.$$

Given a pool of n adverts, there will be n scores: {S1 . . . Sn},

The so calculated similarity score S may be used to calculate the relevance score. As already mentioned above, for calculating the relevance score also other factors may be considered in other embodiments, comprising context, demographics, etc. More complex measures such as nDCG can be used to score relevance when the rank of keywords is available.

Algorithms can also be used to find the most important or salient keywords based on a combination of metadata supplied in the steps before. For example, if the metadata only states that a movie has the two genres "Action" and "Comedy" without any weights to indicate if the movie is more of an action movie or a comedy, then the algorithm can be used to calculate these weights. Likewise, if only the cast members are listed, without indicating which is the main and secondary cast members, then an algorithm can be used to find out which are the main cast members based on facial recognition and screen time.

In a preferred embodiment, the relevance algorithm executes a dynamic calculation of the relevance over time, which is to be construed such as the relevance may vary and change over time and this change is going to be considered in the calculation process. Generally, relevance between content (title) and message (advert) is not necessarily static throughout the broadcast of the title, as such relevance could also be represented by relevance@time. An actor may be killed off at minute 60 of a 120 minute movie, at which point the importance of said actor within the keyword list can quickly degrade, even if the person is a main cast. Similarly, a main cast may only be introduced at minute 60, which means up to that point, the actor should be extremely low on the keyword list, if at all.

Relevance@time can be useful in the case of live content such as concerts or sports, some amount of metadata can and will be available before the broadcast, but events happening during the game can change relevance between title and advert. For example, it may be known that a performer is scheduled to perform during a music festival, but it is not known when. Likewise it may be known that a footballer is a member of a team, but it may not be known if they will play, and how well they will play during the game. As such, the screentime method mentioned in before can be used, either with automated techniques or manually entered. Deprioritization algorithms or time decay algorithms can be used to ensure the first performer who had a screentime of 15 minutes is not considered more relevant than the last performer who performed for 5 minutes so far. Side-channel methods can also be used to augment the keyword list, for example by using sentiment analysis on twitter to identify most recent sentiment towards performers or players; players with better sentiment scores can be moved up the keyword list, while players with lower sentiment scores can be moved lower. Contextual information can also be considered, as a player may have higher sentiment scores among his home crowd but lower among the opposition.

The concept of relevance detailed so far is static, in that the same title and advert will always have the same relevance, or relevance@time.

An alternative implementation is to consider personalized relevance. This concept is related to personalized information retrieval and personalized recommender systems and employs the same concepts. In the preferred implementation, keywords are reranked from either the metadata, or the title, or both based on user preference known a priori. For example, if a movies keywords are: <Crime, Quentin Tarantino, Bruce Willis, Dark Humor, Non-linear> and we know that the user likes non-linear storytelling but dislikes Bruce Willis, then the keyword list personalized for the user could be: <Crime, Non-linear, Quentin Tarantino, Dark Humor, Bruce Willis>. Methods for content preference elicitation through explicit or implicit feedback are known and may be used here.

Additional user-specific demographic or contextual information such as geographical location could be used in concert, or independently. Context data includes time, location, device used to consume media. User-advert relationship can be optionally included, i.e. which ads they have already watched. ad preference can also be optionally included, to say which types of ads they generally prefer. ad preference like content preference can be done through various implicit or explicit feedback methods known.

In the next passages it will be described how to determine associated network and storage costs co.

There are different types of costs co that contribute to the total cost for delivering a content.

The network costs co can be described as the distribution costs which depend on the traffic volume. Network costs are typically expressed as a piece-wise linear function or concave function of the number of delivered bytes (volume). The volume represents the output traffic to the number of users who will be consuming the ad. As an example, an ad which will be consumed by a large number of users is more economically efficient in terms of network costs compared to an ad consumed by a small number of users, given the concave nature of cost functions.

The traffic volume V at an edge server i can be expressed by:

$$V_i = \int V_{i,t} \cdot dt - \int \sum_{k=1}^{K} x_i(k) \cdot R_k \cdot \Delta T \cdot dt$$

where K is the number of users, Rk is the streaming bit-rate of user k, and x is a Boolean, which is equal to 1 if a user k is served by an edge i, and ΔT is a video duration. The volume is the sum of traffic over time (for instance traffic volume over 24 hours), costs are typically expressed as a function of the volume, $$C_i = f(V_i) = \alpha \cdot \log(V_i).$$

A new ad being streamed to the user will result in additional traffic. The costs are typically calculated over different egress servers.

In addition to distribution costs, storage costs are an important cost criterion for CDN providers. The storage cost is function of the video size (streaming bit-rate, video duration) and number of stored content. The storage cost S at an edge server i can be expressed by:

$$S_i = \sum_{c=1}^{C} x_i(c) \cdot R_c \cdot \Delta T.$$

where c is a content index (representation index if content is available at multiple bitrate representations), s is a Boolean which is equal to 1 if content is cached at edge i, and Rc is the bit-rate at which the content c is stored. It is thus crucial for a CDN provider to decide which content to cache and when to cache the content. A new ad, which is not cached, will result in additional storage costs co.

Next, it will be explained how to find the best advert message 100 for the user at the client device CD:

Here the relevance algorithm finds the best advert to be shown to the user given the information and constraints that exist. Specifically, it is now known:

(a) The titles that are being watched and the list of associated keywords or concepts (b) Candidate adverts for the titles, and associated keywords/concepts (c) Relevance between titles and all candidate adverts, personalized to the target users if applicable (d) Cost of delivering all candidate adverts to the intended users (e) SLAs to customers Now adverts to users are allocated such that users watch adverts that are most relevant, at the lowest cost to the provider. Optional: we can include the SLA, such that the aforementioned problem statement is modified where we allocate adverts to users such that users watch adverts that are most relevant, at the lowest cost to the provider while seeking to fulfill the SLA. This is done by using a multivariate optimization algorithm commonly done in multivariate statistics, and most easily accomplished with multivariate regression, or can be done with Bayesian Networks by setting the priors accordingly.

The multivariate optimization algorithm can be described by a maximization function and a minimization which includes a set of constraints. We are maximizing the relevance score, between a content/video and an ad message. For a set of possible ads {Ad1, Ad2, . . . AdN} and a video T, multiple scores that associate watch ad with the video can be determined. Approaches to measure the relevance score are discussed above.

A set of demographic and operational constrains that need to be satisfied is minimized. These constraints can include but are not limited to the network and storage costs. For each ad, a storage and delivery cost can be determined as defined above.

The optimization can be applied globally to determine the ad (s) to be served to multiple users, i.e., the sum of relevance scores for different users, and the total costs co. An ad message 100 which is popular has a higher ad reach and results in lower fetching and storage costs as it is watched by multiple users.

In the following it will be described how to apply optimization as preloading an ad message into edge.

Different use-cases are described for utilizing the ad decision to optimize the delivery. The realization of the proposed approach involves the following entities: an edge CS, an ad decision server AD, and a data-base DB for storing ads/videos metadata information. The metadata extraction is realized at a CDN edge. The edge can communicate with a database to retrieve full metadata about the content. The subsequent steps can be implemented at the ad decision server AD which can be realized as a separate function or can be collocated with the CDN edge CS. We can see this as a CDN edge with ad intelligence capabilities.

The following call flows describe different embodiments for pre-loading personalized ads into CDN caches and devices by utilizing ad decision from the previous steps. The proposed methods can be applied at a CDN edge, CDN origin and CDN device CD.

Pre-Loading Into CDN Edge Using Generic MPD

Figure 4:
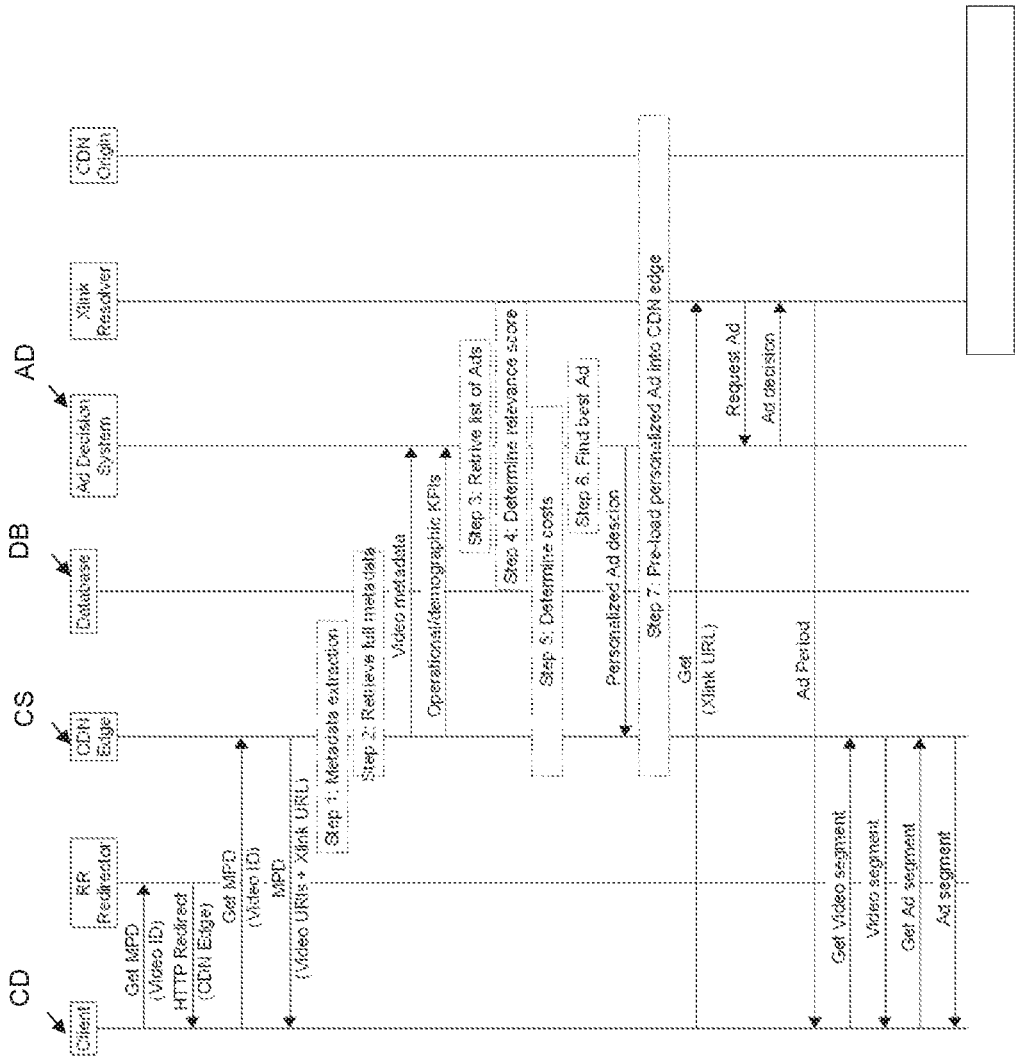
FIG. 4 is an interaction diagram for message transfer between respective devices according to a preferred embodiment of the present invention showing a call flow for dynamic pre-loading of personalized messages into a CDN edge.

A call flow for the proposed solution is shown in FIG. 4. The client is redirected at the beginning of the session to a CDN edge which returns an MPD. The MPD includes video URLs and xlink URLs for the ads. A CDN edge determines the category of the video the client wants to watch (e.g., by extracting metadata about the video) and provides the category information to an ad decision server. Note that category is only illustrative and in fact any or all available metadata (cast, credits, awards, popularity, etc.) can be used. The metadata of the video can be for instance retrieved by the edge from a database (Step 2). The ad decision server determines the personalized ad that corresponds to the watched content by the user for the current session. The process includes steps 3 to 6. The ad decision server provides the ad decision to the CDN edge which pre-loads the personalized ad into the CDN edge before actual playout time (Step 7). The client connects to an xlink resolver to resolve the xlink URL which consults the ad decision server. An ad period is returned to the client and the client starts requesting the video and personalized ad.

Pre-Loading Into CDN Edge Using Personalized MPD

Figure 5:
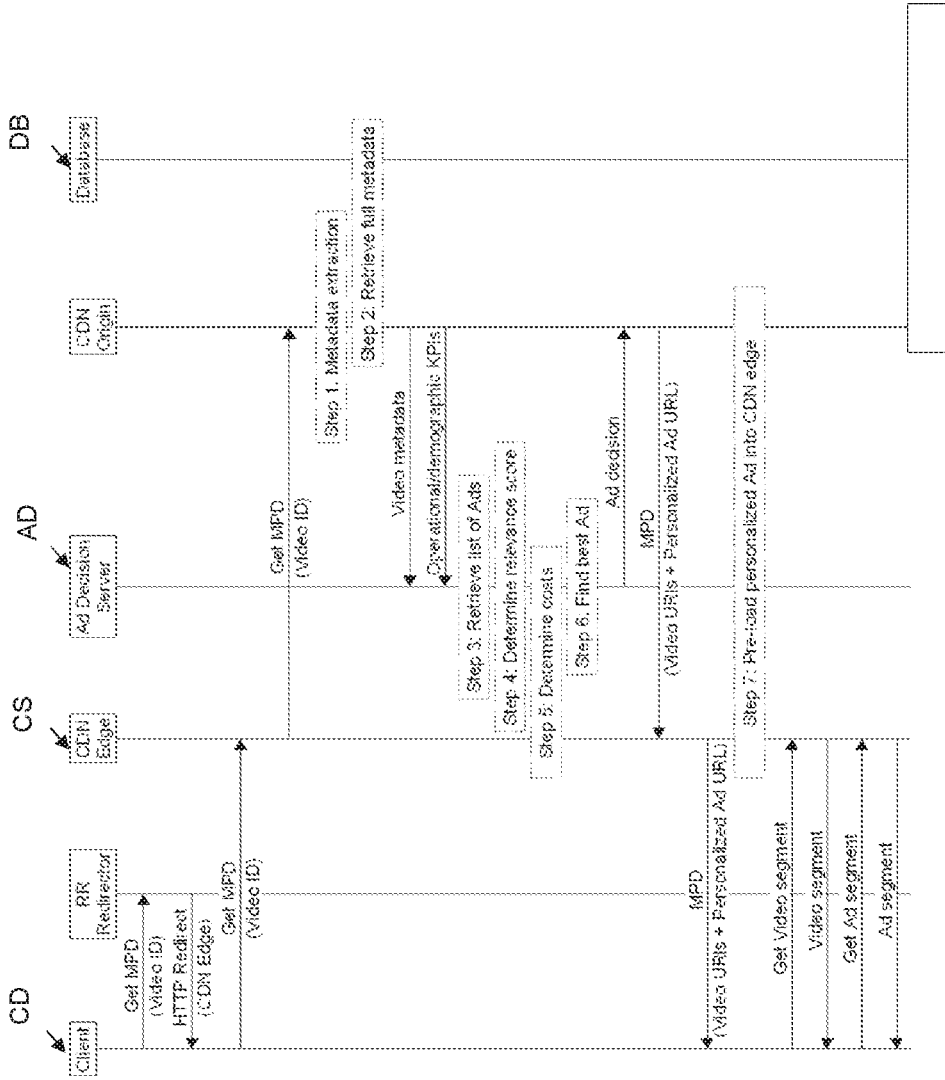
FIG. 5 is another interaction diagram for message transfer between respective devices according to another preferred embodiment of the present invention showing a call flow for dynamic pre-loading of personalized messages into a CDN edge in case of fully personalized MPS or manifest file.

The proposed solution can be also applied in case the MPD is personalized for each client. In this case, a personalized MPD is provided instead of xlink URLs. The call flow is illustrated in FIG. 5. The CDN edge forwards the MPD request for each client to the CDN origin (respectively MPD generator at the CDN origin) to create a personalized MPD. The origin extracts metadata (Step 2) and retrieves full metadata from the database (Step 3). The CDN origin provides video category information to the ad decision server along with other operational and demographic KPIs. The ad decision server applies steps 3 to 6 and returns a personalized ad that matches the user preferences and actual watched content. The CDN origin returns a personalized MPD to the CDN edge server which is provided to the client. The CDN edge applies optimizations as pre-loading the personalized ad before playout time (Step 7).

Predictive Ad Placement

Figure 6:
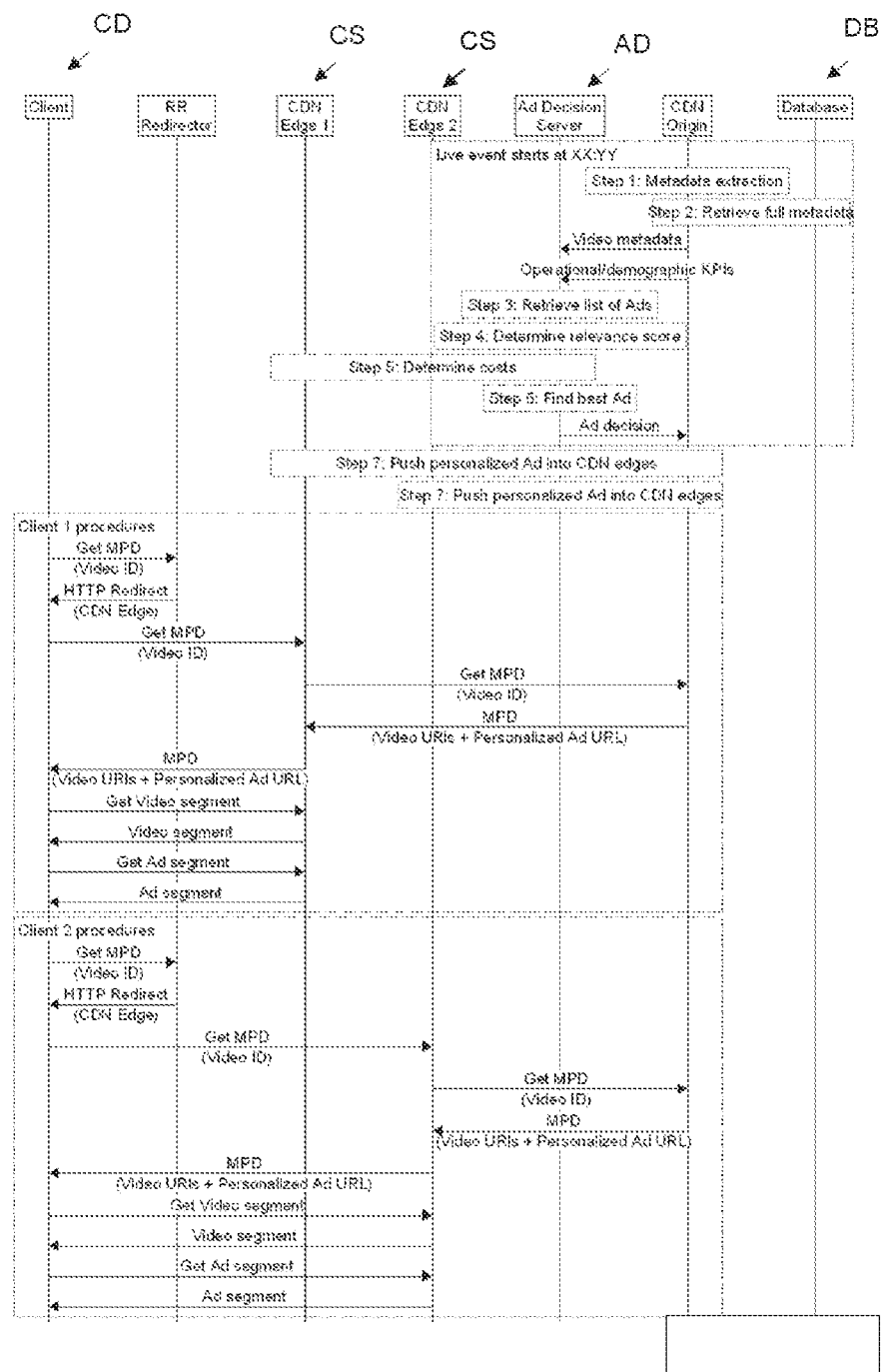
FIG. 6 is a further interaction diagram for message transfer between respective devices according to another preferred embodiment of the present invention showing a call flow for predictive message placement at CDN edges that maximizes relevance by utilizing metadata about content and by minimizing costs.

FIG. 6 shows further optimization procedures (predictive ad placement) by a network provider (e.g., CDN). In case of a live event, multiple clients are interested in watching the same event and personalization can be performed for a group of users. Using the knowledge about personalized ads as provided by the ad decision system and illustrated in the previous steps, an origin server can determine the relevant ads that relate to metadata of the main stream and push personalized ads to different CDN edges before the live event starts.

Pre-Loading Into Device CDN

Figure 7:
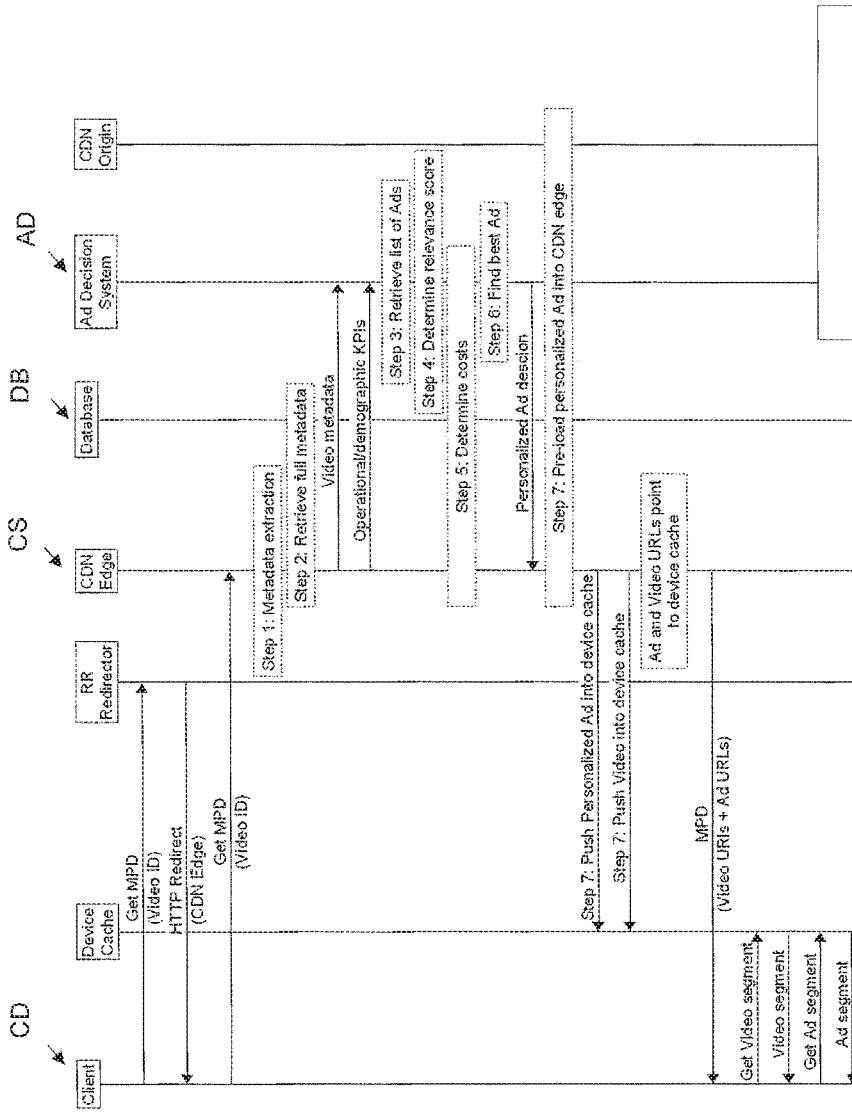
FIG. 7 again is an interaction diagram for message transfer between respective devices according to another preferred embodiment of the present invention showing a call flow for dynamic pre-loading of personalized messages into a client device CD.

While the above embodiments consider pre-loading of personalized ads into CDN edges, the proposed solution also applies for pre-loading ads into client devices for offline viewing. FIG. 7 describes the call flow for the device-CDN embodiment. The CDN edge pre-loads the personalized ads and video into device cache and updates the ad and video URLs to point to the device cache. The edge returns the personalized MPD which includes the video and the personalized ad URLs to the client. The client fetches the personalized ads and video segments from its cache.

The proposed solution has a number of advantages.

Providing personalized messages, in particular ad messages are an important source of income to media service providers. Determining the relevant personalized (ad) messages is important for service providers to enhance the user experience. The proposed method allows a media service provider to provide an enhanced personalized ad experience to the users taking into account metadata about the main video content. Dynamically loading the right messages to the CDN caches provides a better quality of experience (QoE) or User Experience (UX) to the clients. Further, the proposed method allows a media service provider to select a personalized message which matches a particular users consumption behavior. Moreover, an edge is able to apply a global optimization to maximize the overall relevance while minimizing costs. The edge utilizes its view about operational and demographic key performance indicators (KPI) to determine the set of messages which are globally relevant and induce minimal cost. Finally, providing the message at a high quality of experience is highly desired. The proposed method allows to utilize knowledge about the selected message to dynamically pre-load the message into CDN caches and to the user device before actual playout time. Putting the right message in the proximity of the user allows to avoid CDN/transport bottlenecks when playout starts.

While the current invention has been described in relation to its preferred embodiments, it is to be understood that this description is for illustrative purposes only. For example, the client device CD may be a mobile device, like a smartphone, a desktop computer or any other technical apparatus with computing functionality, for example being connected to a CDN system. Messages may also refer to digital messages that can be used in a broad set of business areas and applications such as advertisement messages, information and entertainment or education messages etc. For the person skilled in the art it is clear that the invention may also be used for other digital processing or services besides advertisement processing. Also, the servers need not to be deployed as physical server or server farm. For example, it is also possible that the respective server side functionality described above can be hosted in a virtualized environment as well. Accordingly, it is intended that the invention be limited only by the scope of the claims appended hereto.

The invention claimed is:

1. A method for determining personalized messages during a provisioning of digital content, wherein the method comprises:
    Determining a set containing a plurality of personalized messages candidates by executing a relevance algorithm, which matches message metadata and content metadata based on a calculated relevance score for advertisements to the personalized message candidates, wherein the content metadata for each of the personalized messages candidates is extracted by analyzing content of the personalized message candidate, wherein the message metadata is determined from keywords or descriptions of the advertisements;
    Calculating network costs for each of the personalized messages candidates of the set based on whether a service level agreement (SLA) between a network provider and the user would be satisfied if the personalized messages candidate is selected for delivery through a network to a client device of a user, wherein for each of the personalized messages candidates, of the set containing a plurality, the network cost is calculated based on an amount of at least one of throughput and latency requirement of the SLA that is satisfied if the personalized messages candidate is selected for delivery through a network to the client device of the user; and
    Selecting a personalized message from among the set containing a plurality of personalized messages candidates based on comparing the calculated relevance scores between the personalized messages candidates of the set and further comparing the calculated network costs between the personalized messages candidates of the set to select one of the personalized messages candidates of the set maximizing the calculated relevance score while minimizing calculated network cost.

2. The method according to claim 1, wherein the step of determining the set of personalized messages is adapted to determine personalized messages that are both relevant and cost efficient.

3. The method according to the claim 2, wherein the relevance score is dynamic and may change in reply to a temporal progress of the content provisioning, such as the relevance score is iteratively calculated during content provisioning.

4. The method according to claim 1, wherein the content metadata are extracted automatically, in particular by determining the requested content from a URL or from a manifest file and/or wherein content metadata correspond to actual streamed content delivered to the client device.

5. The method according to claim 1, wherein the method further comprises the step of:
    processing demographic and operational constraints for provisioning of digital content to the device.

6. The method according to claim 1, wherein the relevance algorithm is based on a Jaccard Similarity, a BM25, a BM25F, a cosine similarity algorithm, a latent semantic analysis, a latent Dirichlet allocation, a Pachinko allocation and/or a TF-IDF algorithm.

7. The method according to claim 1, wherein the metadata are extracted automatically, in particular by using a computer vision algorithm, an audio and/or sound recognition algorithm and/or by processing subtitle data.

8. The method according to claim 1, wherein the streaming process is an adaptive streaming process and in particular in a DASH, a HLS or another HTTP-based, RTP-based and/or RTMP-based audio and/or video streaming technique.

9. The method according to claim 1, wherein the set of cost-optimized personalized messages is determined for a group of client devices.

10. The method according to claim 1, wherein the determined set of cost-optimized personalized messages is prepared for pre-loading into the device for offline viewing or into a content server.

11. An ad decision server, comprising:
    A processor circuit adapted to obtain message metadata and content metadata and to determine a set containing a plurality of personalized message candidates by executing a relevance algorithm, which matches message metadata and content metadata based on a calculated relevance score for advertisements to the personalized message candidates, wherein the content metadata for each of the personalized messages candidates is extracted by analyzing content of the personalized message candidate, wherein the message metadata is determined from keywords or descriptions of the advertisements,
    wherein the process is further adapted to calculate network costs for each of the personalized messages candidates of the set based on whether a service level agreement (SLA) between a network provider and the user would be satisfied if the personalized messages candidate is selected for delivery through a network to a client device of a user wherein for each of the personalized messages candidates, of the set containing a plurality, the network cost is calculated based on an amount of at least one of throughput and latency requirement of the SLA that is satisfied if the personalized messages candidate is selected for delivery through a network to the client device of the user; and wherein the processor is further adapted to select a personalized message from among the set containing a plurality of personalized messages candidates based on comparing the calculated relevance scores between the personalized messages candidates of the set and further comparing the calculated network costs between the personalized messages candidates of the set to select one of the personalized messages candidates of the set maximizing the calculated relevance score while minimizing calculated network cost.

12. A content server for providing content, comprising:

An ad decision server according to claim 11, wherein the processor is further adapted to calculate network distribution costs for the set of personalized message candidates.

13. A network system comprising:

A client device;

A content server;

A processor circuit adapted to obtain message metadata and content metadata and to determine a set containing a plurality of personalized message candidates by executing a relevance algorithm, which matches message metadata and content metadata based on a calculated relevance score for advertisements to the personalized message candidates, wherein the content metadata for each of the personalized messages candidates is extracted by analyzing content of the personalized message candidate, wherein the message metadata is determined from keywords or descriptions of the advertisements;

wherein the processor circuit is further adapted to calculate network costs for each of the personalized messages candidates of the set based on whether a service level agreement (SLA) between a network provider and the user would be satisfied if the personalized messages candidate is selected for delivery through a network to a client device of a user, wherein for each of the personalized messages candidates, of the set containing a plurality, the network cost is calculated based on an amount of at least one of throughput and latency requirement of the SLA that is satisfied if the personalized messages candidate is selected for delivery through a network to the client device of the user; and wherein the processor circuit is further adapted to select a personalized message from among the set containing a plurality of personalized messages candidates based on comparing the calculated relevance scores between the personalized messages candidates of the set and further comparing the calculated network costs between the personalized messages candidates of the set to select one of the personalized messages candidates of the set maximizing the calculated relevance score while minimizing calculated network cost.

* * * * *